United States Patent [19]

Liebig

[11] 4,315,708
[45] Feb. 16, 1982

[54] POSITIVELY LOCKING TOGGLE

[76] Inventor: Heinrich Liebig, Wormser Str. 23, 6102 Pfungstadt, Fed. Rep. of Germany

[21] Appl. No.: 122,868

[22] Filed: Feb. 20, 1980

[30] Foreign Application Priority Data

Feb. 22, 1979 [DE] Fed. Rep. of Germany ....... 2906914

[51] Int. Cl.³ ............................................. F16B 13/06
[52] U.S. Cl. ........................................ 411/65; 411/341
[58] Field of Search .................. 85/74, 75, 73, 76, 87, 85/86, 88, 3 S, 3 R; 411/65, 64, 63, 44, 341, 340, 343

[56] References Cited

U.S. PATENT DOCUMENTS

| 927,064 | 7/1909 | Mower | 85/75 |
|---|---|---|---|
| 2,392,491 | 1/1946 | Moran | 85/87 X |
| 2,605,668 | 8/1952 | Hollopeter | 85/3 S |
| 2,771,746 | 11/1956 | Fischer | 85/3 R X |
| 2,878,709 | 3/1959 | Horvath | 85/87 X |
| 3,403,594 | 10/1968 | Newell | 85/3 R X |
| 3,709,546 | 1/1973 | Vaughn | 85/73 X |

FOREIGN PATENT DOCUMENTS

| 223908 | 12/1957 | Australia | 85/76 |
|---|---|---|---|
| 2632487 | 1/1978 | Fed. Rep. of Germany | 85/74 |
| 11070 | 8/1902 | Norway | 85/74 |
| 427174 | 12/1974 | U.S.S.R. | 85/87 |

Primary Examiner—Ramon S. Britts

[57] ABSTRACT

Toggle (10) which can be set form-fittingly on the undercut surface of a bore, having an elongated fastening bolt (18) on whose bore-internal end locking elements (22) are mounted, which can be rocked outwardly by a conical component (28) disposed axially displaceably on the fastening bolt (18) from a position lying within the diameter of the bore (12) to a position engaging the undercut surface (17). The locking elements (22) are supported on a bottom piece (20) on the bore-internal end of the fastening bolt (18) and have the form of sleeve segments integrating, in the non-outspread position, a thick-walled sleeve. Between the axially displaceably disposed conical component (28) and a bolt head, or a nut (38), there is disposed a coil spring (32) which can be placed under bias by axial compression.

15 Claims, 9 Drawing Figures

POSITIVELY LOCKING TOGGLE

The invention relates to a toggle which can be positively locked in a bore provided with a radial undercut circumferential surface, and has a toggle body which corresponds substantially to the diameter of the bore and can be introduced into the bore, on which toggle body locking elements are mounted, whose ends pointing toward the bore orifice can be tilted from a position lying within the diameter of the bore to a position in which they project at least partially beyond the diameter of the toggle body and lockingly catch on the undercut surface of the bore, the toggle body being a bottom piece of relatively short length disposed on the bore-internal end of an elongated fastening bolt on which toggle body the bore-internal ends of the locking elements are seated which are closed together to form a thick-walled cylindrical sleeve surrounding the fastening bolt, and the fastening bolt, bearing on its external end a bolt head or a nut screwed onto a thread of the fastening bolt, has a component entering between the ends of the locking elements pointing towards the bore orifice and tapering conically towards the bore interior, which positively rocks the rearward ends of the locking elements outwardly upon a displacement of the bottom piece towards the bore orifice.

Such a toggle is described in the applicant's earlier U.S. patent application Ser. No. 965,472 filed on Dec. 1, 1978.

The rocking outwardly of the locking elements after insertion into the bore such that the rearward end surfaces of the locking elements towards the bore orifice catch lockingly on the undercut surface is accomplished in the toggle element of the above-mentioned earlier patent application by the fact that the conically tapering component is forced between the locking elements by the turning of the fastening bolt into the bottom piece or by the turning of the nut, and care must be taken to see that the toggle does not rotate in the bore during this turning action, because otherwise no draw against the conical component will be produced and hence also no spreading open of the locking elements. In the case of the toggle according to the earlier patent application, therefore, means are provided for the prevention of any rotation of the toggle, which means can be formed, by example, by a ring fastened to the bottom piece and having holding claws projecting radially starwise, which can catch on the uneven surface of the bore and thereby prevent any rotation of the toggle. This toggle has proven serviceable, but it requires a relatively precise adaptation of the axial dimension to the toggle parts which act upon the conically tapering component, allowance having to be made for the tightening length necessary for the engagement of the locking elements.

Accordingly, the invention addresses the problem of improving the toggle of the earlier patent application such that there will be no necessity for the no precise adaptation of the axial longitudinal dimensions of its parts to the depth at which the undercut surface is provided in the bore. It is furthermore to be possible to set the toggle such that its locking elements can be rocked outwardly to the locking position upon installation, without rotation of the fastening bolt or of the nut, as the case may be, so that thus any separate antirotational means can be dispensed with.

Setting out from the toggle of the kind mentioned above, this object is achieved in accordance with the invention by the fact that at least one sleeve displaceable longitudinally of the bolt and one coil spring which can be biased by axial compression are disposed between the bolt head or nut and the conically tapering component disposed for longitudinal displacement on the fastening bolt. The bias force acts through the tapering component on the locking elements and, upon the insertion into the corresponding bore provided with an undercut surface, rocks them outwardly as soon as the trailing ends of the locking elements pass the edge formed by the undercut surface in the bore.

If the locking elements are held by a resiliently expandable ring placed on their outer sides, which seeks to hold them in the retracted position, the coil spring is best made of such a size that the spring force that can be stored in it by axial compression is greater than the resistance offered by the resiliently expandable ring to the rocking of the locking elements.

The coil spring is preferably fixed in its axially compressed form such that any outward rocking of the locking elements by the force of the spring is prevented, in which case means are provided for releasing the fixation after the at least partial introduction of the toggle into the bore. The locking elements are not, therefore, driven in the outward direction until they have been released from their fixation, i.e., the introduction of the toggle into a corresponding fastening bore is not interfered with by outswung locking elements, which otherwise would first have to be forced back by hand against the tensions of the coil spring. The installation of the toggle thus constructed is therefore simplified and expedited.

The coil spring is best disposed between a sleeve whose bore-internal end abuts against the conically tapering component and another whose bore-external end abuts against the underside of the screw or nut or a washer disposed beneath it.

Alternatively, the sleeve adjoining the tapering component can also be dispensed with, so that the coil spring then abuts directly on this component. Also possible is the combining of the tapering component with the adjoining sleeve to form an integral sleeve-shaped component having a conically tapering end.

The bias of the coil spring can be fixed by providing a holding means whose ends are fastened one to each of the two sleeves and which is under tractional tension, holding the two sleeves at such a distance apart that the coil spring is compressed in the necessary manner, i.e., is kept under bias.

The holding means can be, for example, a strip whose one end is cemented to one of the sleeves and the other to the other sleeve, and whose end adhering to the rearward sleeve is torn away from the sleeve after the introduction of the toggle into the corresponding bore. The bias of the coil spring then presses by means of the bore-internal sleeve against the tapering component, which in turn seeks to rock the locking elements outwardly. The rearward outer edges of the locking elements are therefore urged against the wall of the bore and, as the toggle is inserted, scrape along this wall until the undercut is reached, where the locking elements then snap into the locking position.

It is desirable to provide a pull tab for the tearing away or parting of the holding means adjacent its fastening to the outer sleeve.

An alternative possibility for fixing the coil spring in the compressed, biased position is to place a ring over the end portion of the locking elements pointing towards the bore orifice, to prevent the outspreading of the locking elements. When the toggle is introduced into the bore, this ring must then be removed by stripping it from the locking elements in a direction opposite the direction of insertion.

The stripping off of this ring can be performed manually by the person setting the toggle, but an improvement is recommended whereby the ring has at least one and preferably several lugs distributed at equal angular intervals and projecting beyond the diameter of the corresponding bore, which upon the insertion of the toggle into a corresponding bore engage the surface of the workpiece being fastened or the wall provided with the bore and, as the insertion continues, strip the ring away from the locking elements. The ring in this case is removed automatically and no separate operation is required.

Also advantageous is an embodiment of the toggle of the invention such that at least one, preferably several, radially disposed teeth of sharpened cross section are made in the surfaces of the locking elements facing towards the bore orifice. When the toggle is tightened and placed under load, the teeth then penetrate, doing so first with their radially outspread tips, into the material of the undercut surface, thereby successfully counteracting any possible tendency of the locking elements to be rocked back again, for example because of an undercut surface that is imprecisely cut due to a worn-out undercutting tool, or in the case of the fortuitous presence of a harder pebble in the material of the undercut surface.

To optimize the load-bearing capacity of the set toggle and to prevent any component of the tightening force, acting at right angles to the longitudinal axis of the toggle when the locking elements are outspread, from forcing the bore-internal ends of the locking elements against the fastening bolt, thereby possibly damaging its thread, the surfaces of the locking elements facing towards the interior of the bore can be angled such that, in the expanded locking position they are supported on a broad area on the surface of the bottom piece facing towards the bore orifice, in which case it is desirable to provide on each of the end surfaces of the locking elements a projecting holding rib which, in the outspread locking position, mates with an annular groove provided in the corresponding end surface of the bottom piece.

The invention is further explained in the following description of embodiments in conjunction with the drawing, wherein.

Figure 1:
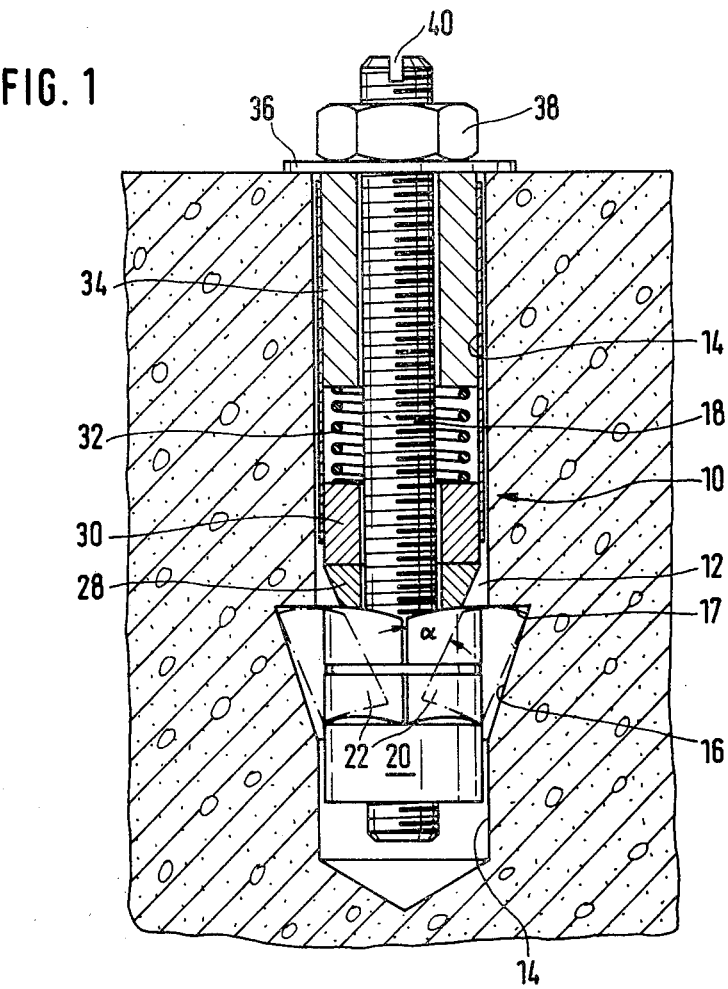
FIG. 1 is a cross-sectional view through a wall section having an undercut bore into which a toggle in accordance with the invention, represented partially in longitudinal central cross section, is inserted in the still unlocked state, the locking position of the locking elements being indicated in broken lines.
Figure 2:
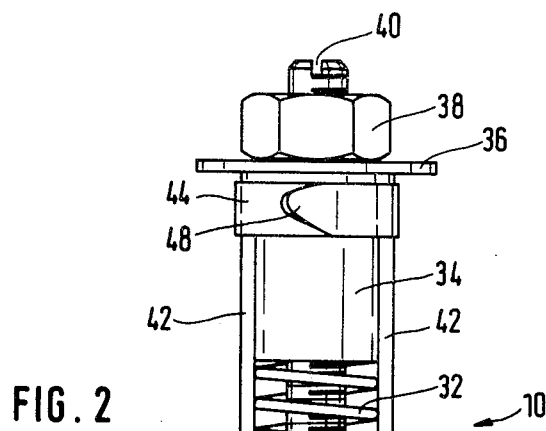
FIG. 2 is a side elevational view of the toggle shown in FIG. 1.
Figure 7:
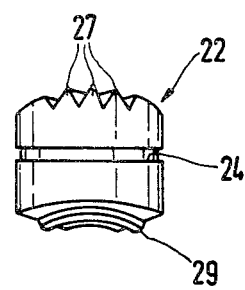
FIG. 7 is a side view of a locking element of the toggle of the invention, on whose end surface facing towards the bore orifice chisel-like teeth are provided.
Figure 8:
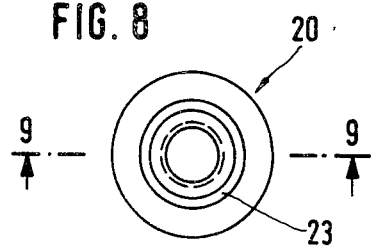
FIG. 8 is a plan view of the end surface of the bottom piece of the toggle of the invention facing towards the bore orifice.
Figure 9:
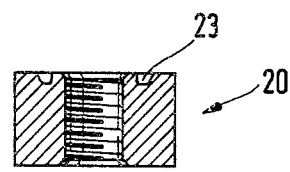
FIG. 9 is a cross-sectional view taken in the direction of the arrows 9—9 in FIG. 8.

The toggle of the invention shown in FIGS. 1 and 2 and designated as a whole by 10 is to be form-fittingly set i.e., positively locked, in a bore 12 consisting of a cylindrical forebore 14 and an expansion bore 16 provided at a distance from the orifice of the bore and having an undercut surface 17 on its side towards the bore orifice. The toggle 10 has an elongated fastening bolt 18 bearing a continuous thread in the illustrated case, on whose bore-internal end a bottom piece 20 is screwed, which is slightly smaller in diameter than the diameter of the forebore 14. The fastening bolt 18 is thus able to be screwed into and out of the bottom piece 20. On the end surface of bottom piece 20 facing rearwardly, i.e., towards the bore orifice, and providing with a circumferential sunken annular groove 23 (FIGS. 8 and 9), three locking elements 22 are resting, which are distributed at regular angular intervals about the fastening bolt, and which when drawn together to the introductory position shown in FIGS. 1 and 2 have the form of a thick-walled sleeve which is divided, however, by three axial seams extending in the longitudinal direction, into the three locking elements 22. A resiliently expandable ring 26 laid in a groove 24 sunk radially in the outside surface of the locking elements holds the locking elements together in the illustrated sleeve-like form. Radially extending teeth 27 of pointed cross section (FIG. 7) can be incorporated into the rearwardly facing end surfaces of the locking elements and, due to the concentration of the tightening force when the toggle 10 is set and placed under load, at first penetrate chisel-like slightly into the material of the undercut surface 17 and promote the tendency of the locking elements to rock outwardly to the locking position even though the undercut surface might not be cut precisely radial on account of a rather worn undercutting tool, or an excessively hard pebble or the like is fortuitously present in the concrete material in the area of contact of the end surface. The locking elements 22 are of such thickness that the sleeve formed by them when they are in the introductory position is of a slightly smaller diameter than the bore. From each of the end surfaces of the locking elements facing toward the bottom piece projects an arcuate housing rib 29 which mates with the annular groove 23 in the bottom piece 20. Adjoining the locking elements 22, a component 28 tapering conically toward the bore interior and engaging at its tapered end between the locking elements 22 is disposed for longitudinal displacement on the fastening bolt 18. The component 28 is adjoined by a short sleeve 30, also longitudinally displaceable on the fastening bolt 18, which can also be combined with the component 28 to form an integral sleeve component tapering conically at the inner end. On the rearward end surface of the sleeve 30 there is disposed a coil spring 32 which is biased by axial compression and whose bore-external end thrusts against the bore-internal end surface of an additional short sleeve 34 also disposed for longitudinal displacement on the fastening bolt 18. The outer end of the sleeve 34 is in contact through an interposed washer 36 with a nut 38 threaded onto the fastening bolt, it being possible by means of a screwdriver inserted into a screwdriver slot 40 provided in the outer end face of the fastening bolt 18 to prevent the fastening bolt from being turned by the turning of the nut 38. The washer 36 provided between the nut 38 and the sleeve 34 transfers the tightening force, produced when the nut 38 is tightened after the locking elements 22 have been locked against the undercut surface 17, to a workpiece which is to be affixed.

Instead of the nut 38, a bolt head can be formed on the end of the fastening bolt 18, by the rotation of which the fastening bolt is screwed into the bottom piece 20.

The expandable ring 26 is selected for its resistance to resilient expansion such that the resilient force holding the locking elements in the retracted position is substantially less than the tightening force stored in the coil spring 32 and acting through component 28 on the rearward end of the locking elements 22. Without additional measures, the locking elements are therefore displaced by the spring 32 to the position outspread at the angle α which is represented in broken lines in FIG. 1, wherein their correspondingly slanted end faces make broad-area contact with the undercut surface 17 and the end surface of bottom piece 20, respectively.

By retracting the sleeve 30, biasing the coil spring 32, when the forward end of the toggle 10 is introduced into the bore of a workpiece to be mounted and into the bore 12, the locking elements can be released, whereupon they are forced by the ring 26 to the retracted position. The setting of the toggle 10 in the manner described thus far is thus made possible by the retraction of the sleeve 30, but it does require this special manipulation of the sleeve 30, so that, in further development of the invention, means are provided which hold the sleeve in the retracted position, fixing the coil spring 32 under bias. Such means are shown by way of example in FIG. 2, and there they consist of two holding means in the form of strips 42. The ends of the strips 42 can be cemented directly to the sleeves 30 and 34, or they can be joined to each sleeve by a separate adhesive band 44 and 46, respectively, wrapped around the sleeves. To release the coil spring from fixation after the toggle 10 has been introduced into the bore, the ends of strips 42 fastened to the outer sleeve are released by tearing off the adhesive band 44 by means of its end in the form of a tear tab 48. The bias force stored in the coil spring 32 then acts through the conically tapering component 28 on the locking elements, and the latter are forced in the manner described above into the outspread locking position.

Figure 3:
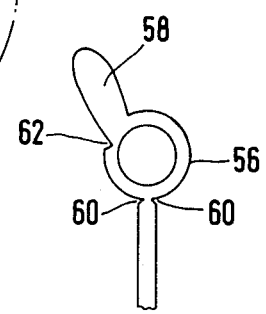
FIG. 3 is a perspective view of a holding means for fixing the bias of the coil spring of the toggle of the invention in the compressed, biased position.
Figure 4:
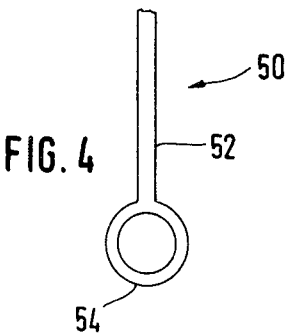
FIG. 4 is a plan view of the holding means shown in FIG. 3.

Instead of the strips 42 cemented to the sleeves 30 and 34, the injection-molded plastic clip 50 shown in FIGS. 3 and 4 can also be used, which is composed of the actual tie strip 52 and the rings 54 and 56 integrally injection-molded onto its extremities. When the toggle 10 is installed, the bottom ring 54 lies between the conical component 28 and the end surface of the sleeve 30, and ring 56 lies between the outer end surface of the sleeve 34 and the washer 36. The tie strip 52 is of such length that the sleeves 30 and 34 are held at the distance apart at which the spring 32 is compressed in the required manner. A pull tab 58 on the outer ring 56 and parting indentations 60 adjacent the tie strip 52 on ring 56 and, if need be, an additional parting indentation 62 in ring 56 permit the release of the coil spring 32 by breaking ring 56 away from the tie strip 52 and also, if desired, by breaking open ring 56 itself, which can then be pulled out from between the sleeve 34 and the washer 36.

Figure 5:
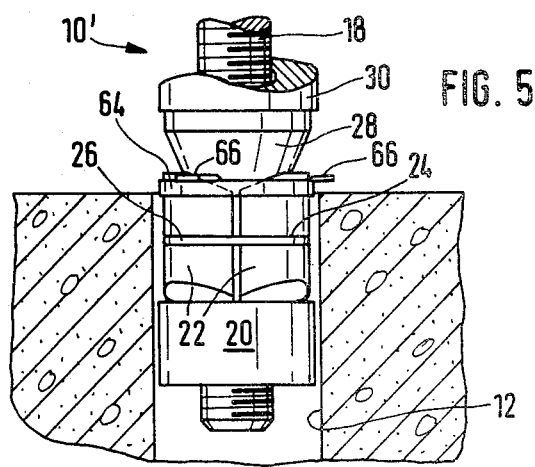
FIG. 5 shows the portion represented in the dash-dotted circle 5 in FIG. 2 of a second embodiment of a toggle in accordance with the invention.
Figure 6:
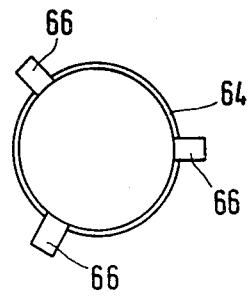
FIG. 6 is a plan view of the ring used in the embodiment of FIG. 5 for fixing the coil spring in the compressed, biased position.

An alternative method of fixing the coil spring 32 in the compressed, biased position is represented in FIG. 5, wherein only the front end of a modified embodiment of a toggle 10' is shown. Since the toggle 10' is largely of the same construction as the previously described toggle 10, and similar parts in both cases are provided with the same reference numbers, it is sufficient to refer to the foregoing description for the general construction of toggle 10'. Instead of the strips 42 or the clip 50, however, in the case of toggle 10', a thin ring 64 is provided which is placed on the rearward end portion of these locking elements to hold them in the retracted position, and which at first prevents the release of the coil spring 32. Lugs 66 radially projecting at uniform angular intervals from the ring 64 beyond the diametrical dimension of the bore 12 serve to strip the ring 64 away from the locking elements 22 when the toggle is introduced into the bore 12, so that the release of the bias of the spring 32 in this case is performed automatically by the axial thrust exercised on the toggle 10' when it is installed.

Modifications and improvements of the above-described positively locking toggle can be realized within the scope of the idea of the invention, relating both to the means for the releasable fixing of the coil spring 32 in the biased position and to the special configuration of the individual parts of the toggle. For example, the holding means can also be formed of a plastic tube drawn over the coil spring 32 and fastened at its extremities to the sleeves 30 and 34, its fastening to sleeve 30 being made releasable, for example, by a tear tab joined to a perforated portion of the tube. It is essential in any case, however, that the locking elements be susceptible of being biased toward the expanded position wherein they catch on the undercut surface by a spring biasable by compression—which need not be in the form of a coil spring, but can be composed, for example, of stacked disk springs or a sleeve-like body which can be resiliently compressed in the axial direction. This bias can be provided either by a fixation which can be released after the insertion of the toggle into the corresponding undercut bore, or the toggle is introduced into the bore with the spring still unbiased and then tightened, for example by turning the nut with simultaneous holding of the fastening bolt by its outer end, such that the locking elements are rocked outwardly by the conically tapered component.

I claim:

1. A toggle for form-locking placement in a bore having an orifice and a radial circumferential undercut surface, said toggle having a toggle body introducible into the bore and corresponding substantially to the diameter of the bore, locking elements mounted on said toggle body and having ends pointing outwardly towards the bore orifice, said ends being rockable from a retracted position located within the diameter of the bore to an outspread, locking position in which they project radially at least partially beyond the diameter of the toggle body and catch lockingly on the undercut surface of the bore, means for holding said locking elements in retracted position until at least partial insertion of the elements into the bore, said toggle body being a bottom piece of relatively short length disposed on the bore-internal end of an elongated fastening bolt, on which bottom piece the bore-internal ends of locking elements, closed together to form a relatively thick-walled cylindrical sleeve surrounding the fastening bolt, are seated, said fastening bolt bearing means threaded onto the fastening bolt and having a component conically tapering towards the bore interior and engaging between the ends of the locking elements pointing towards the bore orifice, said component, upon a displacement of the bottom piece towards the bore orifice, rocking the outwardly pointing ends of the locking elements positively radially outwardly, and at least one sleeve and a coil spring, both disposed between said means threaded onto said bolt and said component and disposed for longitudinal displacement on the fastening bolt, means for placing said coil spring under bias by axial compression, and means for releasing said spring after at least partial introduction of the toggle into the bore.

2. A toggle according to claim 1, wherein said means threaded onto said bolt is a bolt head.

3. A toggle according to claim 1, wherein said means threaded onto said bolt is a nut.

4. The toggle according to claim 1, in which said means for holding said locking elements in said retracted position is a resiliently expandable ring laid on their outer sides, the coil spring being constructed such that the spring force adapted to be stored in the coil spring is greater than the resistance offered by the resiliently expandable ring to any rocking of the locking elements.

5. The toggle according to claim 1, wherein said coil spring is disposed between said sleeve whose bore-internal end engages the conically tapering component and a second sleeve whose bore-external end engages the underside of said means threaded onto said bolt.

6. The toggle according to claim 1, wherein said coil spring is disposed between said sleeve whose bore-internal end engages the conically tapering component and a second sleeve whose bore-external end engages the underside of a washer placed under said means threaded onto said bolt.

7. The toggle according to any one of claims 1, 5 and 6, wherein the bias of said coil spring is fixed by at least one holding means under tractional tension which is fastened at each of its extremities to one of said sleeves.

8. The toggle of claim 7, wherein said holding means is a strip whose ends are cemented one to each of the said sleeves.

9. The toggle according to claim 7, comprising a pull tab for breaking off or parting of said holding means in the area of its fastening to said second sleeve.

10. The toggle according to claim 8, comprising a pull tab for breaking off or parting of said holding means in the area of its fastening to said second sleeve.

11. The toggle according to claim 1, wherein the bias of said coil spring is fixed by a ring laid over the end portion of the locking elements pointing towards the bore orifice.

12. The toggle of claim 11, wherein said ring has at least one ring portion projecting beyond the diametrical dimension of the bore, which ring portion, upon the insertion of the toggle into the bore engages a surface of the object in which the bore is provided so that as the insertion of the toggle continues said ring portion strips off the ring from the locking elements.

13. The toggle of claim 11, wherein said ring has several ring portions distributed at uniform angular intervals and projecting beyond the diametrical dimension of the bore, which ring portions, upon the insertion of the toggle into the bore engage a surface of the object in which the bore is provided so that as the insertion of the toggle continues said ring portions strip off the ring from the locking elements.

14. The toggle according to any one of claims 1 to 4, 5, 6, and 11 to 13, wherein each of the end surfaces of the locking elements facing towards the bore orifice is provided with at least one radially arrayed tooth of pointed cross section.

15. The toggle according to any one of claims 1 to 4, 5, 6, and 11 to 13, wherein the end surfaces of the locking elements facing the interior of the bore are slanted such that they make broad-surface contact with the end surface of the bottom piece facing the bore orifice when said locking elements are in the outspread, locking position, and wherein from each of the end surfaces of the locking elements there projects one holding rib which engages matingly in an annular groove provided in the end surface of the bottom piece in said outspread, locking position.

* * * * *